BEST AVAILABLE COPY

J. A. OWENS.

Assignor, by mesne assignments, to T. A. & W. T. JEBB.

Manufacture of Starch.

No. 9,732. Reissued May 31, 1881.

Witnesses:
Chas. J. Buchholz
Edw. J. Brady

John A. Owens Inventor.
By Wilhelm & Bonner
Attorneys.

127. SUGAR, STARCH,
AND CARBOHYDRATES.

BEST AVAILABLE COPY

UNITED STATES PATENT OFFICE.

JOHN A. OWENS, OF LITTLE FALLS, ASSIGNOR, BY MESNE ASSIGNMENTS, TO THOMAS A. JEBB AND WILLIAM T. JEBB, BOTH OF BUFFALO, N. Y.

MANUFACTURE OF STARCH.

SPECIFICATION forming part of Reissued Letters Patent No. 9,732, dated May 31, 1881.

Original No. 73,259, dated January 14, 1868. Application for reissue filed May 6, 1881.

*To all whom it may concern:*

Be it known that I, JOHN A. OWENS, of Little Falls, in the county of Herkimer and State of New York, have invented new and useful Improvements in the Manufacture of Starch; and I do hereby declare that the following is a full, clear, and exact description of the construction and operation of the same, reference being had to the annexed drawings, making a part of this specification.

Figure 1:
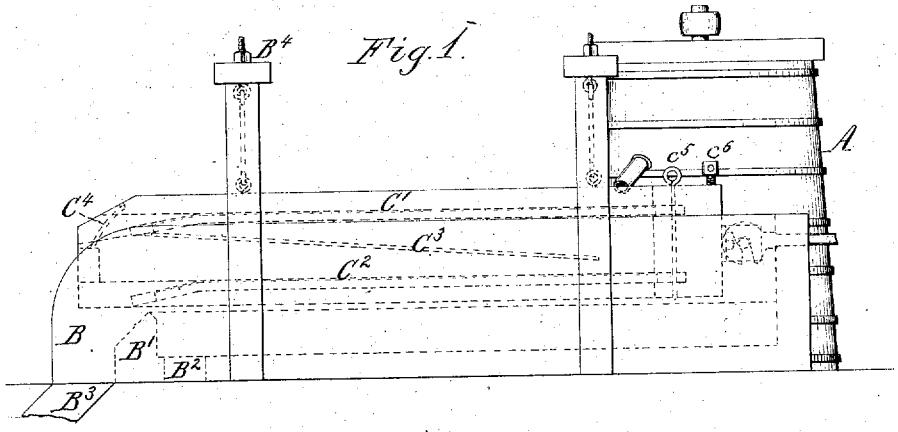
Figure 2:
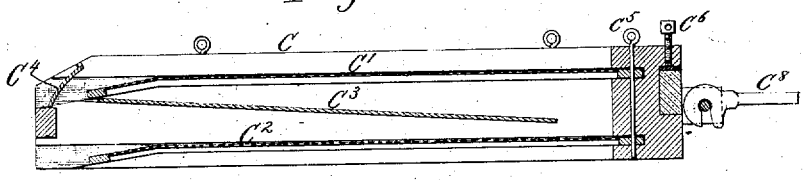
Figure 3:
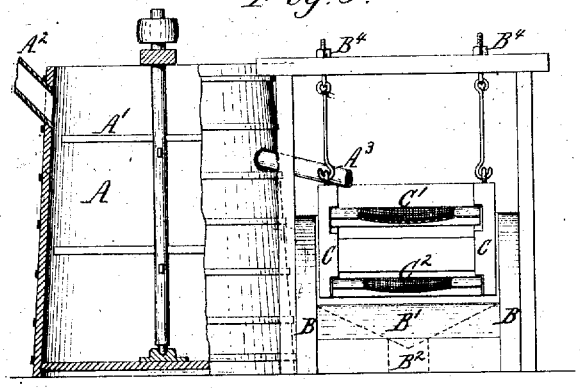
Figure 4:
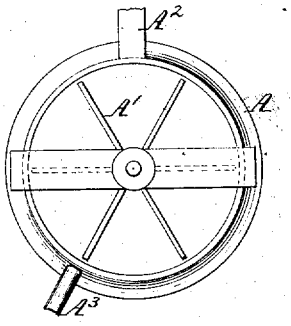
Figure 5:
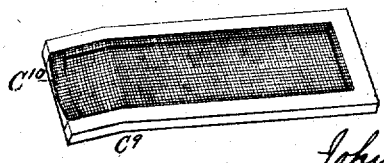

Figure 1 represents a side view of the apparatus; Fig. 2, a sectional view of the screen; Fig. 3, a front view of the apparatus; Fig. 4, a top view of the agitating-tank; Fig. 5, a perspective view of one of the sieves.

A is the agitating-tank; $A'$, the agitating-shaft and arm; $A^2$, a spout from the grinding-stones; $A^3$, a spout to the screen; B, the frame in which the screen is hung; $B'$, a bridge in the bottom thereof to prevent the starch from running down the spout $B^3$; $B^2$, a spout for carrying off the screened stock; $B^3$, a spout for the bran and offal; $B^4$, hook and rods for suspending the screen. C is the frame of the screen. $C'$ is the upper sieve; $C^2$, the lower sieve; $C^3$, an inclined plane between; $C^4$, a guide for turning the bran from the sieve $C'$ into the spout $B^3$; $C^5$, a pin for holding the sieves in place; $C^6$, a screw for pressing on; $C^7$, an india-rubber packing with metallic plate on the top for holding in place; $C^8$, the pitman for agitating the screen. $C^9$ is the bend in the side of the sieves, and $C^{10}$ the curved end.

My invention consists in a new combination of agitator and vibrating screen or sieve, and also in a peculiar construction of the screen, which I believe to be an advantageous arrangement.

In order to obtain the best results in the separation of the starch-water from the chaff or refuse particles by the separator, it is very important that the ground grain and liquid supporting it be presented in a thin and uniform stream over a vibrating surface of considerable extent, and that the quality of the liquid so presented to the screen should be constantly uniform, so that the screen itself should possess the quality of receiving and separating a uniform quantity of liquid over its entire surface, which liquid is itself of uniform consistency, thereby a great saving is obtained, because it is important that all of the starch-water and starch particles pass through the screen, and that none of them be delivered from the surface of the screen to go off with the tailings, and if one portion of the screen is more clogged with material than another, or if the matter delivered to it is not of uniform consistency, it is evident that the best results cannot be obtained. I have therefore interposed between the screen and the stones an agitator, by means of which the water and grain can be reduced to a uniform condition, and I have combined therewith a flat vibrating screen which is capable of receiving this uniform liquid practically over its entire surface, so as to act uniformly at all parts upon this uniform material so delivered to it. This effect cannot be produced by a rotating machine, such as a bolting-machine, which has been previously used in the manufacture of starch, nor can a vibrating screen act uniformly if the substance delivered to it at different times is not itself of uniform consistency. I have further contrived a double screen of peculiar construction, which I believe can be advantageously used wherever vibrating screens are employed for similar purposes. This screen has an upper surface of wire-cloth, which first receives the grain and retains the larger portions of the grain and the silex, which might injure the silk, and the partly-purified liquid is then caused to flow over a silk sieve. By means of this double sieve I obtain in compact form a double sieving of the material, and by making the upper sieve of wire and the lower one of silk I find that my sieves are more durable.

The agitating-tank A may be an ordinary circular tank or cistern having a central vertical shaft with horizontal arms, which shaft may be turned by any convenient power. The tank has a spout, $A^2$, leading from the mill-stones, which conducts the grain as ground into the tank, into which is also run a sufficiency of water to well mix and wash the ground grain, while the agitating-shaft is kept constantly rotating. This, by beating and stirring the grain thoroughly, separates the starch from the bran or husk. When the mass in the tank has risen up to the pipe $A^2$ it commences to run into the screen C, where the coarser bran and husk and foreign matter are separated from the stock. This screen C is composed of a frame, into which are inserted in grooves in its side two or more sieves, $C'$ and $C^2$, with an inclined plane, $C^3$, between them, which may be of sheet metal.

The upper sieve, $C'$, I make of wire bolting-cloth, as better calculated to stand the wear of the silicious matter of the bran and foreign substances which may be mixed with the grain. The gluten, too, does not so readily adhere to it, and much of it passes off with the bran.

The lower sieve, $C^2$, is of the usual fine silk bolting-cloth.

The stock which passes the upper sieve slides down the inclined plane $C^3$ and falls upon the upper end of $C^2$, and as it has none of the coarse bran or offal or foreign matter the sieve operates more freely and allows the stock to pass through more readily, and there is less liability to clog.

Water, of course, is kept running upon the screen while in operation, as in the ordinary process.

All the bran or other matter which does not pass both sieves is carried off by the spout $B^3$, while all that passes both falls down to the sloping bolter of the frame B, and is conveyed by the spout $B^2$ to the proper receptacle below for the further usual treatment.

The screen is shaken in the usual way by a pitman, $C^8$, attached to the screen by a hook or slot in the end, and held in place by the india-rubber in the end of the screen when pressed down by the screw $C^6$, while the other end is attached to a crank. Each of the sieves $C'$ and $C^2$ is formed in a peculiar manner.

The frame for a short distance at the front end is bent down, $C^9$, and the front end of the frame is also curved, $C^{10}$. The object of these changes is to allow the bran and offal to pass over the end of the sieves freely, and the curved end accommodates itself to the sagging of the cloth. When the sieve is straight or there is a sag in the cloth, as there always will be when the sieve is made in the usual manner, the tendency is for the bran to lodge, which retards and renders the work less perfect; but by bending the sides and curving the end, as described, there can be little or no sagging at the front end and the bran passes off freely.

I do not claim to have invented an agitating-tank to be used between the stones and a separator in starch-making, the same having been patented in Letters Patent to Wright Duryea February, 1859, No. 22,789; nor do I claim a flat vibrating sieve, broadly considered, the same being old; but

What I claim as my invention, and desire to secure by Letters Patent, is—

1. The combination of a stirrer or agitator which receives the ground grain from the mill or stone and maintains the liquid in uniform condition with a flat vibrating sieve adapted to separate the starch-water from the refuse uniformly, for the purpose of obtaining a uniform product and preventing loss of starch, substantially as described.

2. A compound sieve for sieving the reduced grain in a starch-making machine, which consists of two portions, the first composed of a wire mesh and adapted to receive the grain as it comes from the mill, and the second of silk or similar material, for the purpose of finally separating the refuse from the starch particles, substantially as described.

3. The screen C, constructed of the sieves $C'$ and $C^2$, and the inclined plane $C^3$, substantially as described.

4. A flat sieve provided with an inclined front end, substantially as shown and described.

JOHN A. OWENS.

Witnesses:
JNO. J. BONNER,
EDW. J. BRADY.